United States Patent

[11] 3,542,061

| [72] | Inventor | Kalman Kormos<br>North Scituate, Rhode Island |
|---|---|---|
| [21] | Appl. No. | 789,733 |
| [22] | Filed | Jan. 8, 1969 |
| [45] | Patented | Nov. 24, 1970 |
| [73] | Assignee | General Signal Corporation<br>a corporation of New York |

[54] CHECK VALVE
3 Claims, 2 Drawing Figs.

[52] U.S. Cl. .................................................. 137/496
[51] Int. Cl. ................................................ F16k 15/00
[50] Field of Search ........................................ 137/496,
494, 533, 540, 116, 508

[56] References Cited
UNITED STATES PATENTS

| 213,118 | 3/1879 | Locke | 137/496 |
| 3,297,260 | 1/1967 | Barlow | 137/496X |
| 3,392,750 | 7/1968 | Soberski | 137/496 |

FOREIGN PATENTS

| 56,956 | 4/1944 | Netherlands | 137/496 |

Primary Examiner—M. Cary Nelson
Assistant Examiner—R. B. Rothman
Attorney—Barlow & Barlow ABSTRACT: A check valve assembly for a diaphragm operated type check valve which is provided with means to prevent rupture of the diaphragm if an excessive differential in absolute pressures are present between the inlet and the outlet ports.

Patented Nov. 24, 1970

3,542,061

INVENTOR
KALMAN KORMOS
BY
Barlow & Barlow
ATTORNEYS

CHECK VALVE

BACKGROUND OF THE INVENTION

Conventional diaphragm check valves which comprise broadly a plug supported by a diaphragm have been in use for some time. The function of the check valve is to prevent leakage of some fluid or gas when the back pressure on the downstream side of the valve rises above a predetermined limit. There are occasions when the back pressure exceeds the normal design load for the diaphragm in use, and accordingly the diaphragm will rupture. In the past it has been customary to increase the thickness and/or strength of the diaphragm to effectively design against such an occurrence, but this is not totally satisfactory as the sensitivity of the check valve is impaired.

SUMMARY OF THE INVENTION

A check valve having a body with a chamber therein has a plug member mounted within the chamber by virtue of a diaphragm which permits the plug to reciprocate from a valve closed position to a valve open position depending upon the relative pressures between the upstream and downstream ports that connect to the chamber. The diaphragm that mounts the plug may be made of extremely thin material to allow for great sensitivity, and the thin diaphragm material is protected against rupture from high back pressures by the provision of an overlying annular portion on the plug with a sealing means which will engage the diaphragm and force the same against the shelf provided within the chamber. This construction then does not allow any unsupported portion of the diaphragm to be exposed to large back pressures.

DESCRIPTION OF THE PREFERRED EMBODIMENT

Figure 1:
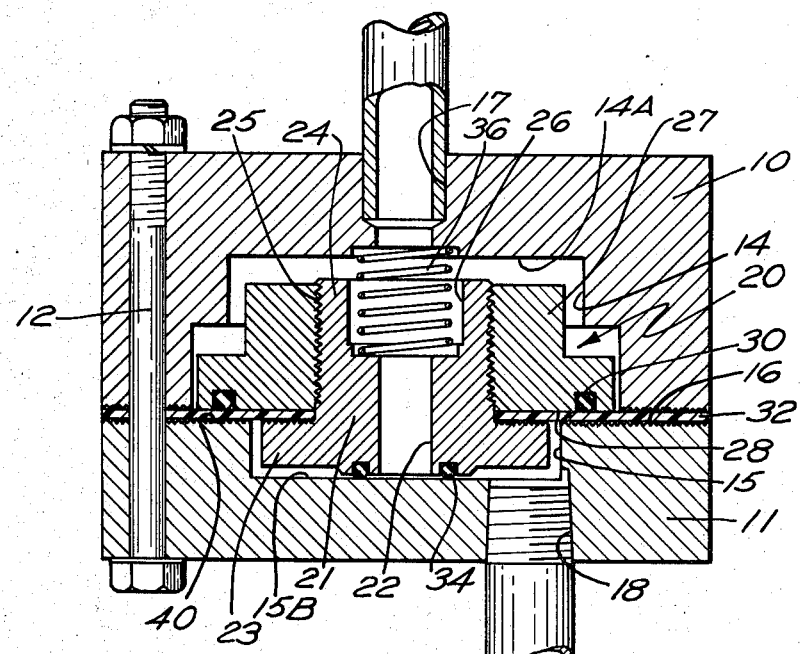
FIG. 1 is a sectional view of the valve with the part shown in position when the valve is closed.

With reference to the drawings, there is provided a body for the check valve consisting of an upper portion 10 and a lower portion 11 which body halves are joined together and held in assembled relationship by through bolts 12, at least three of which are provided and which are spaced about the periphery of the body sections. A recess 14 is provided in the upper portion 10 of the body member, and a recess 15 is provided in the lower section 11, which together form an annular chamber. The diameter of the recess 15 is less than that of any portion of the recess 14 so that at the junction of these two recesses, a shelf 16 is formed in the annular chamber.

Figure 2:
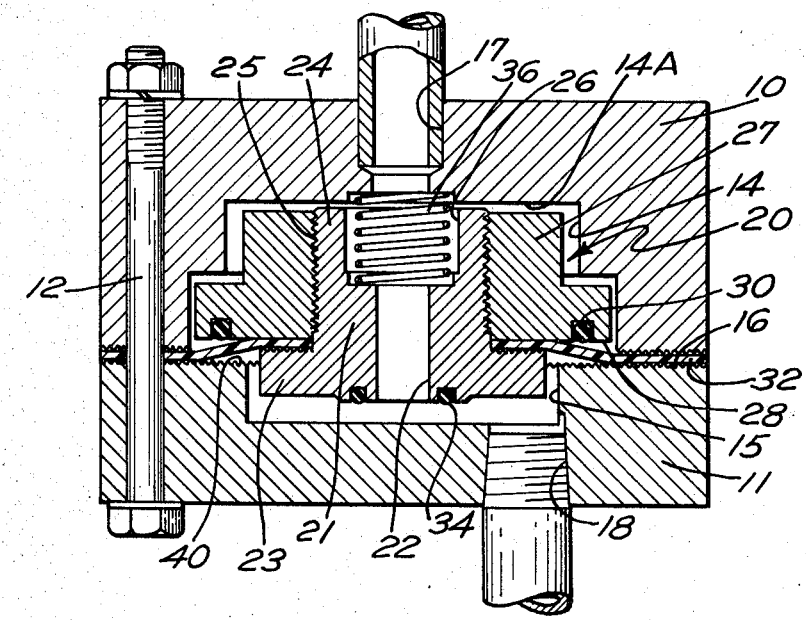
FIG. 2 is a similar sectional view of the valve with the valve open.

Passing through the body part 10 and into the recess 14 is an opening or port 17 which serves as an outlet, and passing through the body member 11 is a similar port 18 which serves as an inlet port and which communicates with the recess 15. Mounted within the area known as an annular chamber that is formed by the recesses 14 and 15 is a valve plug generally designated 20 which is made up of two sections, there being an inner section 21 having a conduit 22 therethrough, and this section 21 is made up effectively of a head 23 with a stem 24 which is threaded as at 25. A counterbore 26 in the conduit area 22 is provided, and the remaining portion of the plug is made up of an upper portion 27 which is threadingly received on the threads 25 and which has a lower face 28 that is grooved to receive an 0-ring 30. A diaphragm 32 is received between the two portions of the valve plug and is clamped thereby. This diaphragm is also received between the two parts 10 and 11 of the body member to be clamped thereby. The lower face of the head 23 of the valve plug portion 21 has an 0-ring 34 that is received about the conduit opening 22, and this 0-ring is adapted to engage the surface 15B of the recess 15 to close the conduit 22 from communication with the port 18 to normally urge the valve plug downwardly against the surface 15B. A spring 36 is received in the counterbore 26 and abuts the upper surface 14A of the recess 14. The valve in operation is shown in FIG. 2 with a flow normally occurring from the port 18 through the conduit 22 and thence out the outlet port 17. In this condition of operation the pressure at the inlet port 18 is greater than that at the outlet portion 17 so that, in effect, it can be said that as long as the absolute pressures at the inlet 18 and the outlet 17 are such that the inlet pressure is greater than the outlet pressure and that the difference exceeds the closing effect of the spring 36, the valve will remain in the position of FIG. 2. Under some conditions of operation, however, an abnormal condition may exist at which time an excessive pressure will be present at the outlet 17 which is not overbalanced by an excessive pressure at the inlet 18. When this occurs, the valve plug will be forced downwardly as viewed in the drawing very tightly.

Reference should now be had to FIG. 1 where it will be noted that when the valve plug is forced downwardly with an excessive pressure condition at the outlet, the 0-ring 34 will prevent any backflow through the valve, and the 0-ring 30 will be pressed tightly against the diaphragm 32, preventing any flow from the outlet from leaking by and exerting itself against the unsupported portion of the diaphragm that exists between the edge of the surface 16 and the recess 15. This condition thereby protects the unsupported inner section of the diaphragm which might otherwise rupture by the excessive back pressure.

It is sometimes desirable to prevent any creeping of the diaphragm 32, and to this end serrations such as shown at 40 on the shelf 16 may be provided, which serrations are quite normal in the gripping portion of a diaphragm and, of course, are carried outwardly to the outer edge of the body member where the diaphragm 32 is gripped between the parts 10 and 11. Under all conditions the grooves 40 are not necessary, but they are desirable particularly at the mating portion of the two parts.

I claim:

1. A check valve comprising a valve body member, an annular chamber in said body member, said chamber having an annular shelf, a cylindrical valve plug, a diaphragm, said valve plug mounted in said chamber by said diaphragm, the peripheral portion of said diaphragm normally lying on said shelf, said plug having an annular portion overlying said shelf, said portion having a continuous circular seal means for engaging said diaphragm, said plug having a conduit therethrough, means cooperating with one end of said conduit to seal the conduit, inlet and outlet ports opening into said chamber at either side of said diaphragm, and means to normally urge said plug in a direction to seal said conduit.

2. A check valve as in claim 1 wherein said diaphragm is gripped by said plug between opposed surfaces at least one of which is roughened.

3. A check valve as in claim 1 wherein said annular shelf surface is roughened.